(12) United States Patent
Terranova et al.

(10) Patent No.: US 6,868,434 B1
(45) Date of Patent: Mar. 15, 2005

(54) SYSTEM AND METHOD FOR TESTING SERVER LATENCIES USING MULTIPLE CONCURRENT USERS IN A COMPUTER SYSTEM

(75) Inventors: Mark C. Terranova, Maynard, MA (US); Michael P. Shea, Nashua, NH (US); Robert E. Walsh, Foster City, CA (US); Michael V. Iarrobino, Bedford, NH (US); Michael J. Stokes, Beckenham (GB)

(73) Assignee: Sun Microsystems, Inc., Santa Clara, CA (US)

( * ) Notice: Subject to any disclaimer, the term of this patent is extended or adjusted under 35 U.S.C. 154(b) by 647 days.

(21) Appl. No.: 09/633,476

(22) Filed: Aug. 7, 2000

(51) Int. Cl.[7] .............................................. G06F 15/16
(52) U.S. Cl. ..................................... 709/203; 709/217
(58) Field of Search ............................... 709/203, 217, 709/208, 219, 222, 223, 227; 707/500.6, 10; 713/1, 100; 714/33

(56) References Cited

U.S. PATENT DOCUMENTS

| | | | | |
|---|---|---|---|---|
| 5,355,497 A | * | 10/1994 | Cohen-Levy | ................ 707/200 |
| 5,485,606 A | * | 1/1996 | Midgdey et al. | ............... 707/10 |
| 5,838,909 A | | 11/1998 | Roy et al. | |
| 5,966,162 A | | 10/1999 | Goode et al. | |
| 6,138,112 A | * | 10/2000 | Slutz | .............................. 707/2 |
| 6,154,744 A | * | 11/2000 | Kenner et al. | ................. 707/10 |
| 6,178,419 B1 | * | 1/2001 | Legh-Smith et al. | ........... 707/6 |
| 6,243,832 B1 | * | 6/2001 | Eckes et al. | .................... 714/33 |
| 6,269,401 B1 | * | 7/2001 | Fletcher et al. | .............. 709/224 |
| 6,321,264 B1 | * | 11/2001 | Fletcher et al. | .............. 709/224 |
| 6,415,317 B1 | | 7/2002 | Yelon et al. | |
| 6,560,648 B1 | * | 5/2003 | Dunn et al. | .................. 709/224 |
| 2002/0026321 A1 | * | 2/2002 | Faris et al. | ..................... 705/1 |
| 2002/0147969 A1 | * | 10/2002 | Lethin et al. | ................ 717/138 |

* cited by examiner

*Primary Examiner*—Hosain Alam
*Assistant Examiner*—Ben Bruckart
(74) *Attorney, Agent, or Firm*—Meyertons Hood Kivlin Kowert & Goetzel, P.C.; B. Noël Kivlin (57) ABSTRACT

A system and method for testing server latencies using multiple concurrent users in a computer system is provided. A computer system may include a server and one or more clients. Multiple users may be created in the system such that each user may login to the server. The server may include a directory for each user and the directory for each user may be populated with a mix of files according to a user type for each user. An instance of a test program may be executed for each user on one or more clients concurrently. The server may authenticate each user using the same or different operating system protocols. Each instance of the test program may be configured to cause a series of accesses to one or more files in the directory of its respective user on the server and may be configured to cause a latency value to be measured and stored for each access that is performed. The latency values may be compiled by each instance of the test program and may be stored onto the server upon completion of each instance of the test program. The latency values measured by an instance of the test program may represent a first time portion that corresponds to the amount of time to perform a given access and a second time portion that corresponds to the server verifying that the user corresponding to this instance of the test program has permission to access the file. The accesses performed may include read accesses or write accesses.

20 Claims, 11 Drawing Sheets

| User Type | User | File Uses | File Size | Load Rate | Str. Rate | File Load Mix |
|---|---|---|---|---|---|---|
| Small | Clerks<br>• Sales Assistants<br>• Inventory / Stock Clerks<br>• Accounting Clerks | Transaction Records | 1 - 2 kilobytes | 1 Mb/hr. | 6.7 Mb/min. | 70% / 20% / 10% |
| Medium | Managers<br>Secretarial Workers<br>Administrative Workers<br>• Human Resource Representatives<br>• Marketing Personnel<br>• Executives | Memos, Letters | 20-80 kilobytes | 1.5 Mb/hr. | 10 Mb/min. | 10% / 70% / 20% |
| Large | Technical / Creative Workers<br>• Engineers<br>• Programmers<br>• Graphic / Mechanical Designers<br>• Architects | Design Files | 0.5 - 2 megabytes | 1 Mb/hr. | 6.7 Mb/min. | 10% / 20% / 70% |

SYSTEM AND METHOD FOR TESTING SERVER LATENCIES USING MULTIPLE CONCURRENT USERS IN A COMPUTER SYSTEM

BACKGROUND OF THE INVENTION

1. Field of the Invention

This invention relates generally to the field of computer systems and, more particularly, to testing server latencies in computer systems.

2. Description of the Related Art

Computer systems may include multiple clients coupled to a server. A server may be configured to store information such that the information may be accessed by multiple users using one of the clients. A server may operate using an operating system such as Solaris, Linux, Windows 2000, or Windows NT. An operating system may be configured to create users that may access files on the server. These users may be given varying access privileges to information on the server and may be included in a group where each member of the group may be given a predefined set of access privileges within the system.

As computer systems become more powerful, servers and their operating systems may become able to support increasing numbers of users in a given system. As the number of users in the system increases, the number of tasks that the server may need to perform may also increase. The tasks of a server or more particularly, the operating system operating on the server, may include creating and deleting users, logging in and logging out users, performing accesses to files on the server on behalf of users, and possibly executing applications or other programs on the server. As the number of users and hence, the number of tasks increases, the latency in performing a given task may increase as the task may not be completed until busy resources within the server become available. It would be desirable to measure server latencies in a system with multiple users. It would further be desirable to measure server latencies in a system with multiple users where the users are modeled according to an organization profile. A system and method to broadly measure server latencies is needed.

SUMMARY

The problems outlined above may in large part be solved by the use of the system and method described herein. Generally speaking, a system and method for testing server latencies using multiple concurrent users in a computer system is provided. A computer system may include a server and one or more clients. Multiple users may be created in the system such that each user may login to the server. The server may include a directory for each user and the directory for each user may be populated with a mix of files according to a user type for each user. An instance of a test program may be executed for each user on one or more clients concurrently. The server may authenticate each user using the same or different operating system protocols. Each instance of the test program may be configured to cause a series of accesses to one or more files in the directory of its respective user on the server and may be configured to cause a latency value to be measured and stored for each access that is performed. The latency values may be compiled by each instance of the test program and may be stored onto the server upon completion of each instance of the test program. The latency values measured by an instance of the test program may represent a first time portion that corresponds to the amount of time to perform a given access and a second time portion that corresponds to the server verifying that the user corresponding to this instance of the test program has permission to access the file. The accesses performed may include read accesses or write accesses.

In one embodiment, a setup program may be configured to create multiple users on a server in a computer system. The setup program may also be configured to create home directories for each user on the server and may further be configured to populate the home directory of each user with a mix of files that corresponds to the user type of each user. Once the setup program completes, a test script may be initiated. The test script may be configured to coordinate the concurrent execution of instances of a test program for a set of users in the system. The test script may cause each client in the system to be reset, may cause a system clock to be synchronized, may cause a directory share to be created, and may cause an instance of a test program to be initiated for each of a set of users. Each instance of a test program may generate and store values that may be analyzed in accordance with the type of test being performed.

In one embodiment, a test program may be configured to generate and store latency values associated with accesses to files on the server in the system. A server may authenticate a user corresponding to the test program and may provide a token that may be used by the test program to access files on the server. The test program may cause files within the directory structure of the user to be enumerated into a table and may cause an order of these files to generated according to a seed value using a random number generator. The test program may then cause read and write accesses to the files in the order generated by the random number generator. The test program may store a latency value associated with each access. Each successive access may be made to the same file as a previous access or to a different file as the previous access. When a file is first accessed, it may be opened on the server and the server may verify that the user associated with the test program has permission to perform an access to the file using the token. The time taken by the server to perform the verification may be reflected in the latency value stored by the test program.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 1:
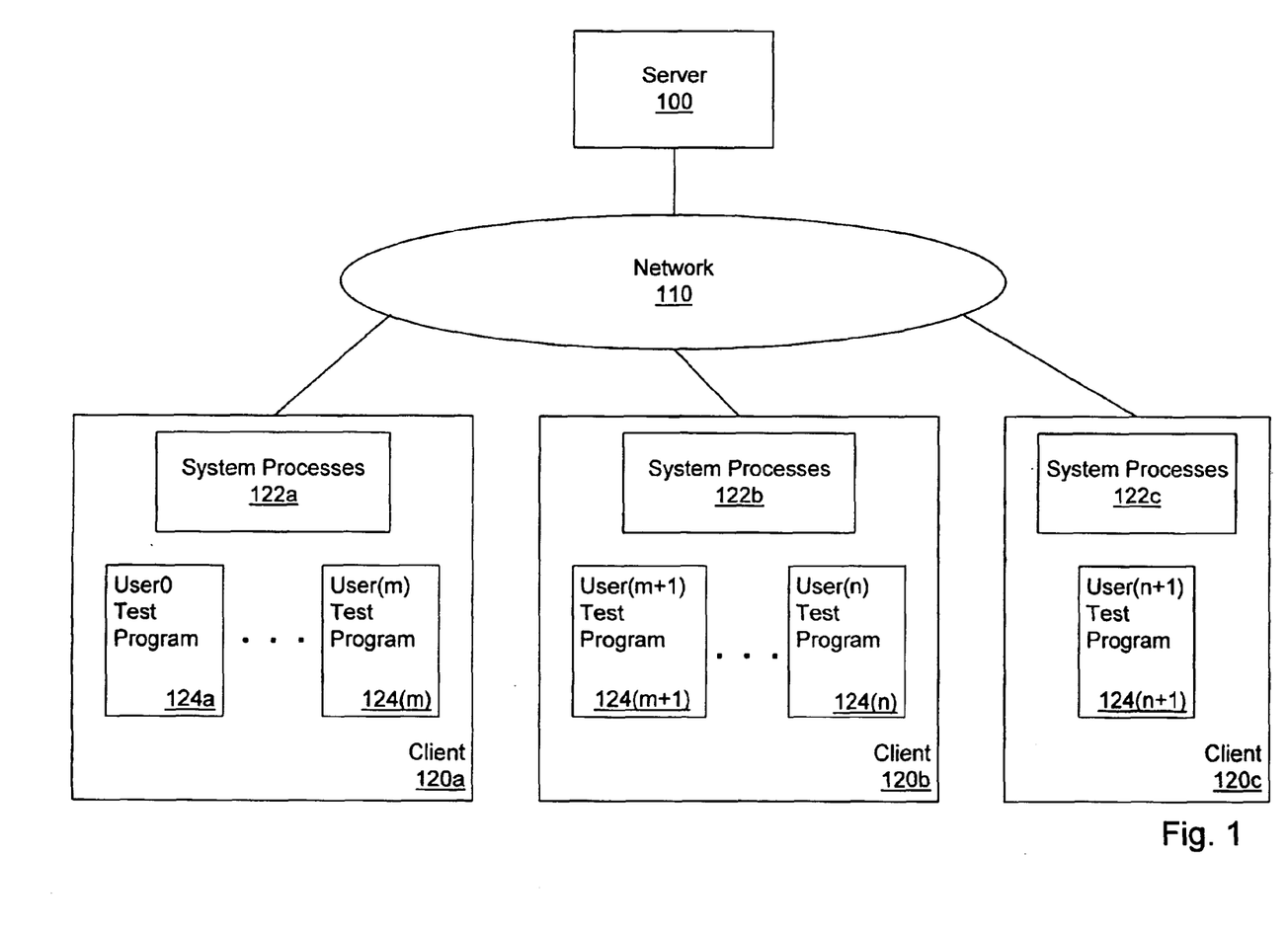
FIG. 1 is a block diagram illustrating one embodiment of a computer system configured to test server latencies using multiple concurrent users.

Turning now to FIG. 1, a block diagram illustrating one embodiment of a computer system configured to test server latencies using multiple concurrent users is shown. FIG. 1 depicts server 100 coupled to clients 120a, 120b, and 120c through network 110. Clients 120a, 120b, and 120c may be configured to execute system processes 122a, 122b, and 122c, respectively. System processes 122a, 122b, and 122c may include operating system routines or other applications. Clients 120a, 120b, and 120c may also be configured to concurrently execute user0 test program 124a through user (m) test program 124(m), user(m+1) test program 124(m+1) through user(n) test program 124(n), and user(n+1) test program 124(n+1), respectively.

Clients 120a, 120b, and 120c are shown by way of example as other embodiments may include other numbers of clients coupled to server 100. Clients 120a, 120b, and 120c may also be configured to execute other types of programs. Clients 120a, 120b, and 120c may be referred to individually as a client 120 or collectively as clients 120. User0 test program 124a through user(n+1) test program 124(n+1) may be referred to individually as a test program 124 or collectively as test programs 124. Each test program 124 may also be referred to as an instance.

FIG. 1 illustrates a system for testing server latencies using multiple concurrent users. Clients 120 may each be configured to concurrently execute one or more instances of a test program 124 on behalf of multiple users. Each user may be created on server 100 such that server 100 may login a user in response to that user attempting to access a file or other resource on server 100. Server 100 may create a home directory for each user and the home directory for each user may be populated with a mix of files according to a user type for each user as described in more detail below. Each test program 124 may cause communications to take place with server 100 across network 110.

Server 100 may authenticate a user for each test program 124 using the same or different operating system protocols. In one embodiment, each instance of test program 124 may be configured to cause a series of accesses to one or more files in the directory of its respective user on server 100 and may be configured to cause a latency value to be measured and stored for each access that is performed. The latency values may be compiled by each instance of test program 124 and may be stored onto server 100 upon completion of each instance of test program 124. The latency values measured by an instance of test program 124 may represent a first time portion that corresponds to the amount of time to perform a given access and a second time portion that corresponds to server 100 verifying that the user corresponding to this instance of the test program has permission to access the file. The accesses performed may include read accesses or write accesses.

Figure 2:
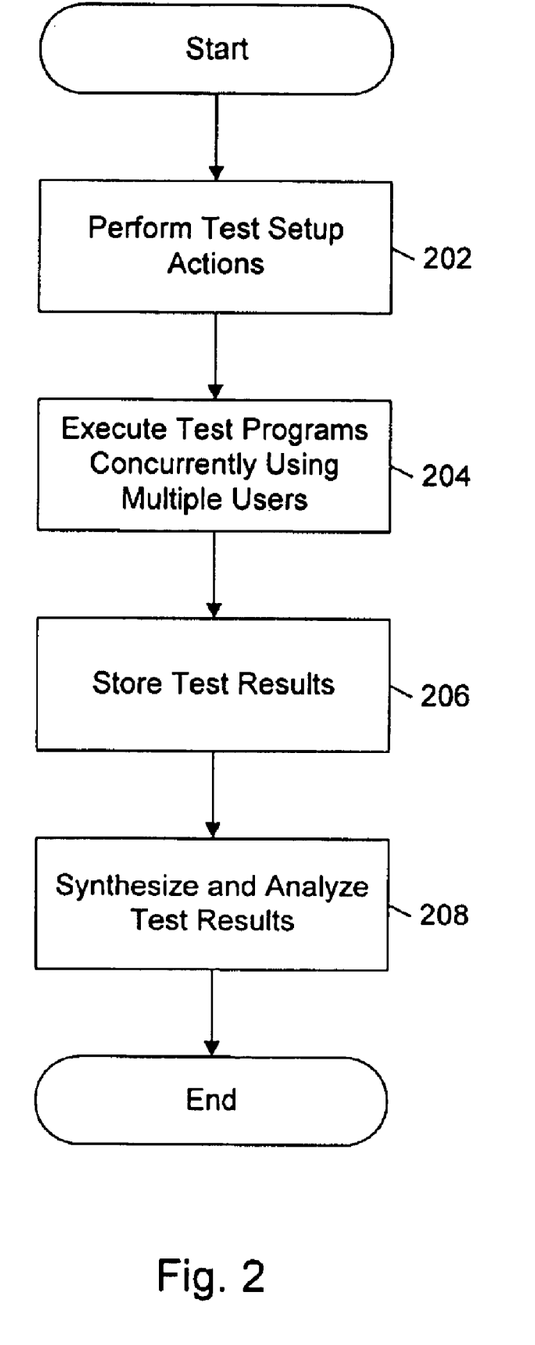
FIG. 2 is a flow chart illustrating a method for testing server latencies using multiple concurrent users.

FIG. 2 illustrates a method for testing server latencies using multiple concurrent users is shown. Variations on the method are possible and contemplated. Test setup actions may be performed as indicated in block 202. Example test setup actions may include creating users, creating home directories for the users, and populating the home directories with files according to a user type of each user. Test programs may be concurrently executed using multiple users as indicated in block 204. A test program may, for example, measure and store latencies associated with file accesses. One embodiment of a test program is described below with respect to FIGS. 8b and 8c. Test results generated by the test program may be stored as indicated in block 206 and the test results may be synthesized and analyzed as indicated in block 208.

Figure 3:
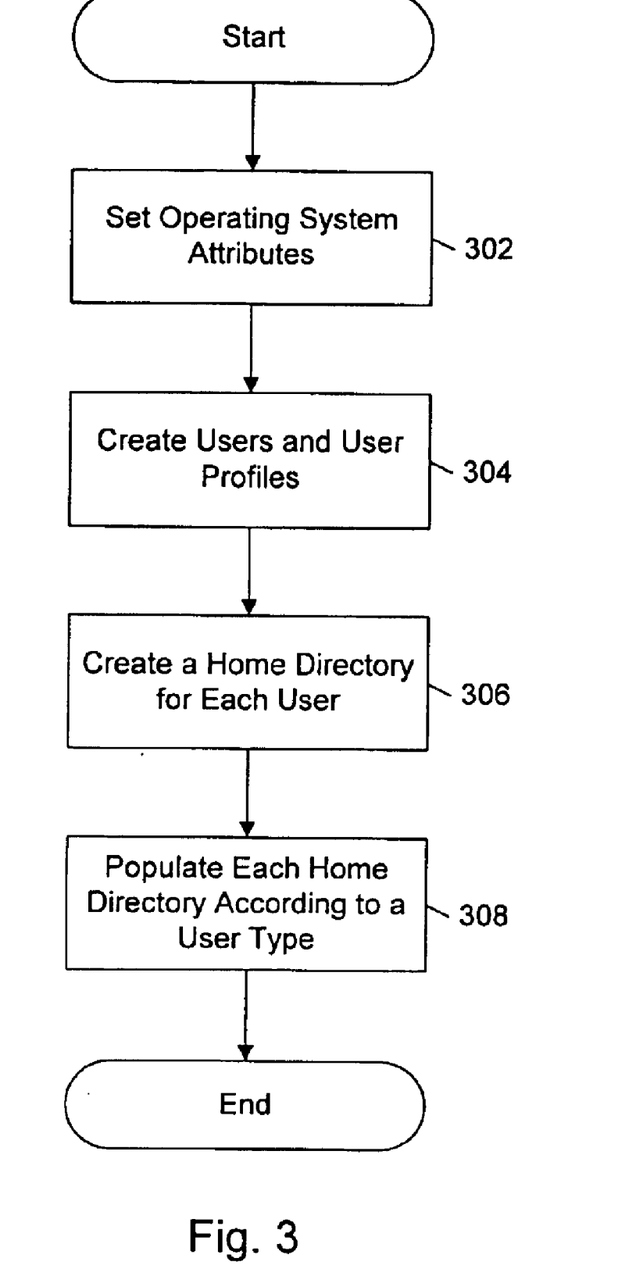
FIG. 3 is a flow chart illustrating a method for setting up a test environment.

Turning now to FIG. 3, a flow chart illustrating a method for setting up a test environment is shown. Variations on the method are possible and contemplated. Operating system attributes may be set as indicated in block 302. The attributes set may depend on the type of operating system employed by a server such as server 100 shown in FIG. 1.

In one embodiment where a server employs the Windows NT operating system, certain Advanced User Rights may be set to allow a user to impersonate another user. Under normal circumstances, Windows NT may prevent a user from impersonating another user for security reasons. This security enforcement may be overcome by setting the following Advanced User Rights.

1. Act as part of the Operating System
2. Create a Token
3. Increase quotas
4. Replace a process-level token.

Once these Advanced User Rights are set, a server may support multiple users from a single client such as clients 120 shown in FIG. 1. A client 120 may use a token to launch multiple instances of test program 124 for different users. Client 120 may do so by copying the token and including impersonate bits in the new token when launching an instance of test program 124. In doing so, each instance of test program 124 may be effectively executed by a different user and server 100 may interact with each instance as though it were being executed by a different user.

Referring back to FIG. 3, users and user profiles may be created as indicated in block 304 and a home directory may be created for each user as indicated in block 306. Users and corresponding user profiles may be created according to a user creation protocol of an operating system employed by a server. In one embodiment where a server employs the Windows NT operating system, users may be created using the Security Accounts Manager (SAM) database of the Primary Domain Controller (PDC) in a Windows NT domain. In addition, the access control list (ACL) for the home directory of each user may be set.

In one particular embodiment, users may be created using a CreateUsers program. The CreateUsers program may be executed on a client such as client 120 shown in FIG. 1. The CreateUsers program may be used to create a specified number of users and may be executed using the following variables.

| Variable | Explanation |
| --- | --- |
| MINUSER | First user number |
| MAXUSER | Number of users to create |
| HOMEDIR | Location of home directory on server for all users created |
| HOMECOMPUTER | Location of server (PDC) for all users created |
| USER PREFIX | Prefix added to user number to create user name |
| USER POSTFIX | Postfix added to user number to create user name |

For example, the following would create user1 to user500 in the current domain.

set MINUSER=1
    set MAXUSERS=500
    set HOMEDIR=c:\export\home\users
    set HOMECOMPUTER=venom
    set USERPREFIX=user
    set USERPOSTFIX=createusers.

In this example, all users would be configured with \\venom\c$\export\home\users as the directory where their individual home directories would be created. The home directories would be named user0, user1, user2, . . . , user 499.

The CreateUsers program may use a MakeUsr program to create users and create a profile for each user. The syntax of the MakeUsr program may be:

makeusr user_name [password] [switches]

The switches for the MakeUsr program may include:

| Switch | Explanation |
| --- | --- |
| /DOMAIN | Create a global user account in the domain versus a local user account on the local computer. (Default: local computer). |
| /LOCAL:local_group | Add account to the specified local_group. Multiple /LOCAL switches may be allowed. In addition, a list of groups may be supplied in the MULOCAL command shell variable. |
| /GLOBAL:global_group | Add account to the specified global_group. Multiple /GLOBAL switches may be allows. In addition, a list of groups may be supplied in the MUGLOBAL command shell variable. |
| /FULLNAME:name | Specify full name for the account. Use quotes if the name contains spaces. |
| /PROFILEPATH:path | Profile path for this account. |
| /SCRIPTPATH:path | Logon script path for this account. |
| /HOMEDIR:path | User home directory. If /HOMECOMPUTER is not specified, this may be a local path. If /HOMECOMPUTER is specified, this is a local path relative to that computer (e.g. C: refers to C: on that computer). |
| /HOMECOMPUTER:name | Computer to contain home directory. (Default: local computer). |
| /HOMEPROTO:uncpath | Unified naming convention (UNC) name of the prototype home directory. May be copied to the home directory when created. |
| /COMMENT:text | Text comment for this user name |

Additional options may be set up by initializing command shell variables prior to executing the MakeUsr program.

A CleanUser program may be used to remove users from the SAM database of a PDC. The CleanUser program may use the following variables.

| Variable | Explanation |
| --- | --- |
| MINUSER | First user number |
| MAXUSER | Last user number |
| USER PREFIX | Prefix added to user number to create user name |
| USER POSTFIX | Postfix added to user number to create user name |

Figure 4A:
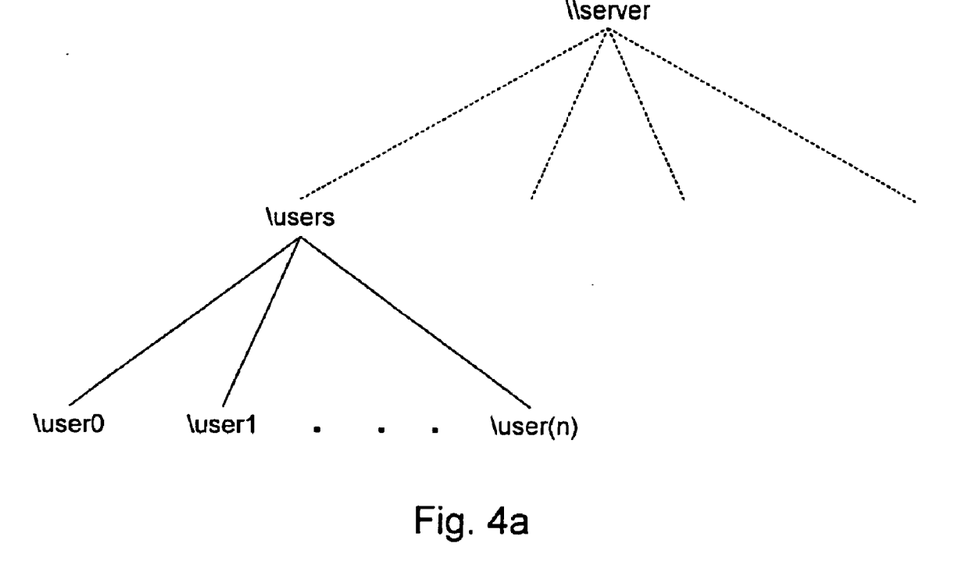
FIG. 4a is a diagram illustrating a directory structure.

For example, the following would delete user100 to user200 in the current domain.

set MINUSER=100
    set MAXUSERS=200
    set USERPREFIX=user
    set USERPOSTFIX=cleanuser FIG. 4*a* is a diagram illustrating generally the creation of a home directory for each user. As may be seen, home directories \user0 and \user1 through \user(n) where n represents the (n−1)th user may be created in a directory named \users. The directory \users may be created anywhere within the directory structure of a server. In FIG. 4*a*, the root directory of a server may be named \\server and the dashed lines indicate paths to other directories within the directory structure. The directory \users may be directly under the root directory \\server or any number of directories may be included between the root directory \\server and the directory \users.

Figure 4B:
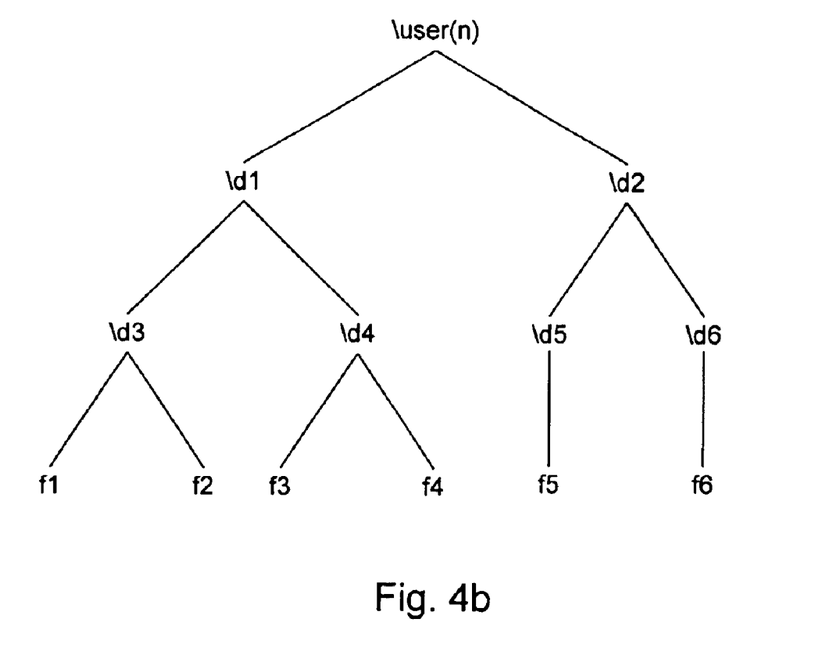
FIG. 4b is a diagram illustrating one example of populating a directory structure.

Referring back to FIG. 3, each home directory may be populated according to a user type as indicated in block 308. The home directory of each user may be populated with a set of files that corresponds to a user type for that user. A test program may be configured to perform accesses to these files. FIG. 4*b* illustrates one example of a home directory populated with files and a directory structure. FIG. 4*b* shows the directory of user(n), \user(n), populated with files f1, f2, f3, f4, f5, and f6 using directories \d1, \d2, \d3, \d4, \d5, and \d6 as shown. The size of each file f1 through f6 may vary according to a user type for user(n). In addition, the directory structure, i.e. the arrangement of directories \d1 through \d6, may vary according to a user type for user(n). Other home directories may be populated with other numbers and sizes of files as well as other directory structures.

By populating the home directory of a user according to a user type, the concurrent execution of an instance of a test program by multiple users may simulate a user load of an organization on a server. Organizations may comprise different types and number of users that access different sizes and types of files on a server. In order to simulate the user load of an organization, the number and type of users of the organization may be created. Instances of a test program may cause accesses to files in each user's home directory on the server according to a user's user type to simulate a user load of the organization on a server.

Figure 5:
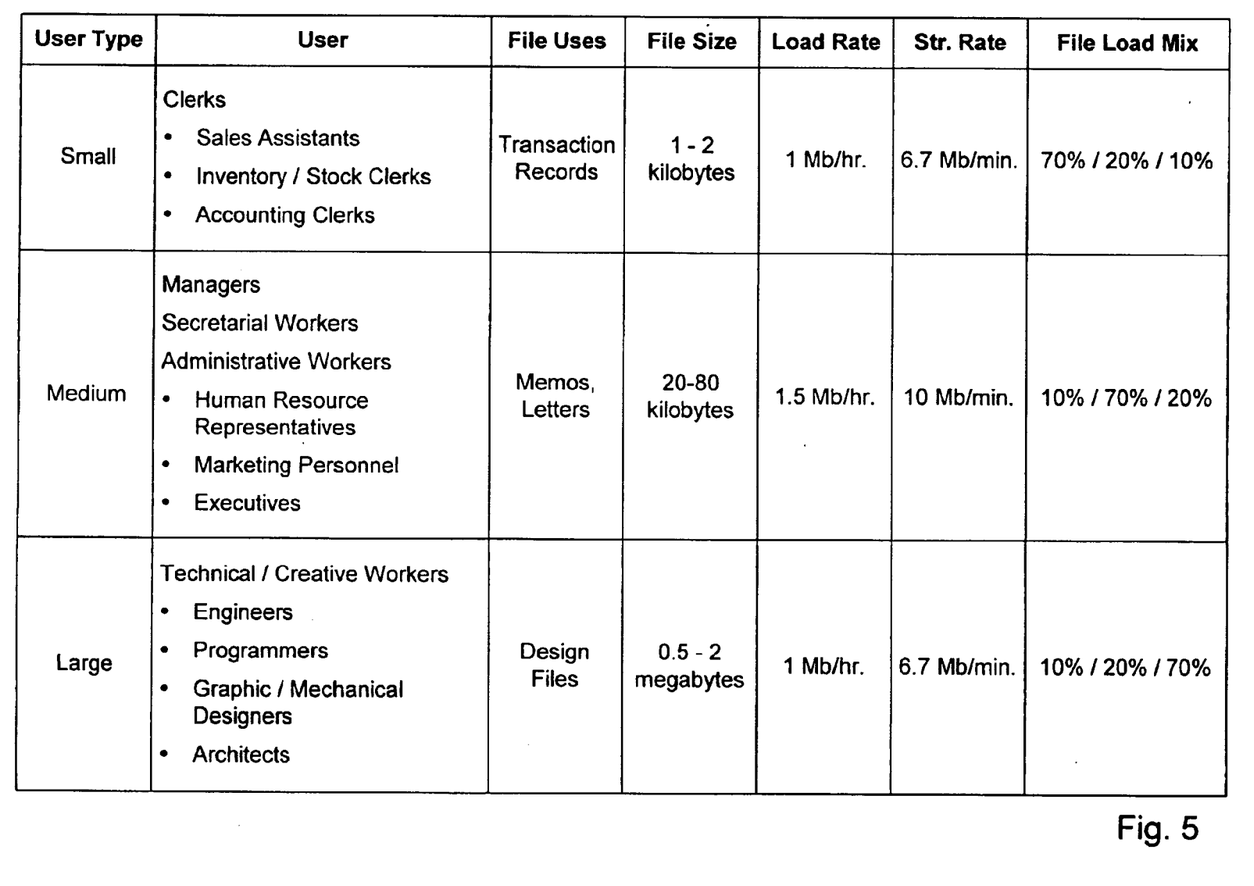
FIG. 5 is a table illustrating attributes of different user types for an example organization.

FIG. 5 is a table illustrating attributes of different user types of an example organization. FIG. 5 depicts users, file uses, file sizes, load rates, stress rates, and file load mixes for each user type. As shown in FIG. 5, the example organization may include three user types: small, medium, and large. The file uses and sizes indicate the use and size of files typically accessed by each user type. The load rate indicates a network transfer rate for each user type under typical conditions. The stress rate indicates a network transfer rate for each user type under stressed, i.e. test, conditions. The file load mix indicates the percentage of each of three respective files sizes: small, medium, and large. The small file size may refer to files that are 1–2 kilobytes, the medium file size may refer to files that are 20–80 kilobytes, and the large file size may refer to files that are 0.5 to 2 megabytes.

Users in the organization that correspond to the small user type, "small users", may be clerks such as sales assistants, inventory and stock clerks, and accounting clerks. The typical files accessed on a server by small users may be transaction records that are 1–2 kilobytes in size. Small users may have a load rate of 1 megabyte per hour and a stress rate of 6.7 megabytes per hour. Small users may access small files 70% of the time, medium files 20% of the time, and large files 10% of the time.

Users in the organization that correspond to the medium user type, "medium users", may be managers, secretarial workers, and administrative workers. Administrative workers may include human resource representatives, marketing personnel, and executives. The typical files accessed on a server by medium users may be memos and letters that are 20–80 kilobytes in size. Medium users may have a load rate of 1.5 megabytes per hour and a stress rate of 10 megabytes per hour. Medium users may access small files 10% of the time, medium files 70% of the time, and large files 20% of the time.

Users in the organization that correspond to the large user type, "large users", may be technical and creative workers such as engineers, programmers, graphic and mechanical designers, and architects. The typical files accessed on a server by large users may be design files that are 0.5 to 2 megabytes in size. Large users may have a load rate of 1 megabyte per hour and a stress rate of 6.7 megabytes per hour. Large users may access small files 10% of the time, medium files 20% of the time, and large files 70% of the time.

Although the percentage of read accesses versus write accesses may be set by a test program, the default percentage may be set to 80% read accesses and 20% write accesses for each of the user types shown in FIG. 5.

It may be seen that an organization may be readily modeled using the above user types. For example, if the organization is an equipment supplier that designs, markets, and sells its own products, the personnel and the correspond user of types may be modeled as follows.

| Department | Title | Number | User Type |
| --- | --- | --- | --- |
| Executive | President | 1 | Medium |
| | Vice-President | 1 | Medium |
| | Secretarial | 1 | Medium |
| Sales | Manager/Supervisor | 1 | Medium |
| | Inside Sales Representatives | 10 | Small |
| | Outside Sales Representatives | 5 | Medium |
| | Secretarial | 1 | Medium |
| Marketing | Manager/Supervisor | 1 | Medium |
| | Marketing Specialists | 4 | Medium |
| | Secretarial | 1 | Medium |
| Engineering | Manager/Supervisor | 1 | Large |
| | Engineers/Technicians | 6 | Large |
| | Secretarial | 1 | Large |
| Finance/ | Manager/Supervisor | 1 | Medium |
| Accounting | Accountant | 1 | Medium |
| | Clerks | 3 | Small |
| | Secretarial | 1 | Medium |
| Warehouse/ | Manager/Supervisor | 1 | Medium |
| Shipping | Clerks | 8 | Small |
| | Secretarial | 1 | Medium |
| Human | Manager/Supervisor | 1 | Medium |
| Resources | Human Resources Representatives | 3 | Medium |
| | Secretarial | 1 | Medium |
| Facilities | Manager/Supervisor | 1 | Medium |
| | Maintenance Personnel | 3 | Small |
| | Secretarial | 1 | Medium |

The above organization results in the following numbers per user type.

| User Type | Number |
| --- | --- |
| Small | 24 |
| Medium | 28 |
| Large | 8 |

Loading ratios from the above numbers may be derived as follows.

Small:Medium:Large=24:28:8=3:3.5:1

This ratio represents the mix of small, medium, and large user types that may be presented to a server under test. This user mix may provide a distribution of file accesses that is representative of an actual system such as the system shown in FIG. 1.

Figure 6:
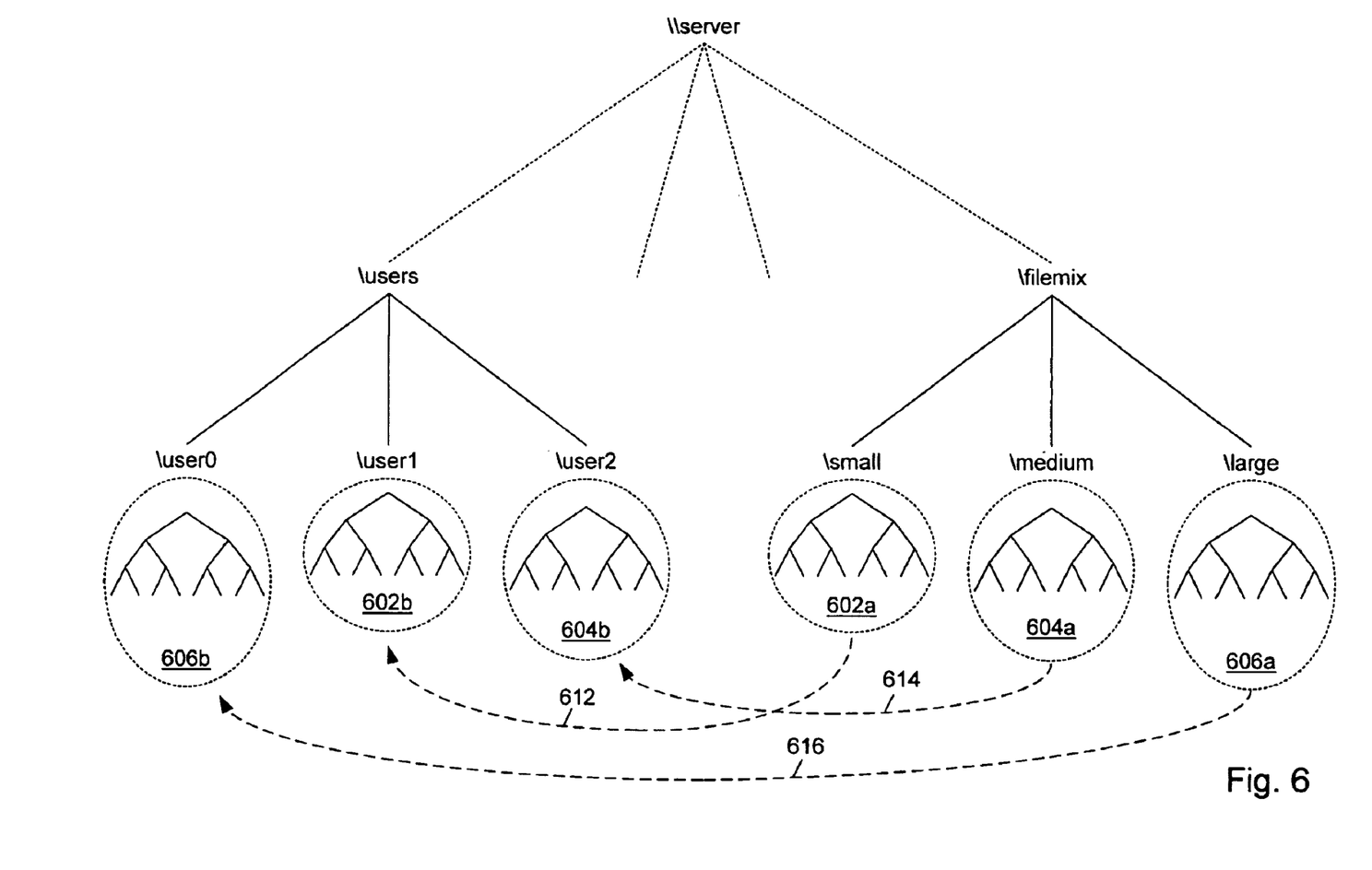
FIG. 6 is a diagram illustrating an example of populating the directory structures of multiple users.

Turning now to FIG. 6, a diagram illustrating an example of populating the directory structures of multiple users is shown. As shown in FIG. 6, user home directories \user0, \user1, and \user2 may be created in a directory named \users. The directory \users may be created anywhere within the directory structure of a server. In FIG. 6, the root directory of a server may be named \\server and the dashed lines indicate paths to other directories within the directory structure. The directory \users may be directly under the root directory \\server or any number of directories may be included between the root directory \\server and the directory \users. Similarly, the directory \filemix may be directly under the root directory \\server or any number of directories may be included between the root directory \\server and the directory \filemix.

The directory \filemix may include the directories \small, \medium, and \large. The directory \small may include directory structure 602, the directory \medium may include directory structure 604, and the directory \large may include directory structure 606. Each directory structure 602, 604, and 606 may include a set of subdirectories and files. Directory structures 602, 604, and 606 may each correspond to a different user type. For example, directory structure 602 under the directory \small may correspond to a small user type such as the small user described above in FIG. 5. Similarly, directory structure 604 under the directory \medium may correspond to a medium user type such as the medium user described above in FIG. 5, and directory structure 606 under the directory \large may correspond to a large user type such as the large user described above in FIG. 5. Thus, directory structures 602, 604, and 606 may include a mixture of files and directories appropriate for their respective user types.

FIG. 6 illustrates a method of populating the home directories of a plurality of users. In the example of FIG. 6, user0 may correspond to a large user type, user1 may correspond to a small user type, and user2 may correspond to a medium user type. In order to populate the home directories for each of these users, the directory structure corresponding to each user's user type may be copied from the appropriate directory under the directory \filemix. As illustrated by arrow 616 in FIG. 6, directory structure 606 may be copied to the directory \user0 to populate the home directory of user1. Similarly, directory structure 602 may be copied to the directory \user1 to populate the home directory of user1 as illustrated by arrow 612, and directory structure 604 may be copied to the directory \user2 to populate the home directory of user2 as illustrated by arrow 614.

The method of populating a user's home directory shown in FIG. 6 illustrates one example of how a user's home directory may be populated. Numerous other methods are possible and contemplated. These other methods may include copying directory structures from a wider variety of user types that may have different file mixes than those described, generating directory structures for user types dynamically, or other methods that make files on a server available to a given user.

Figure 7:
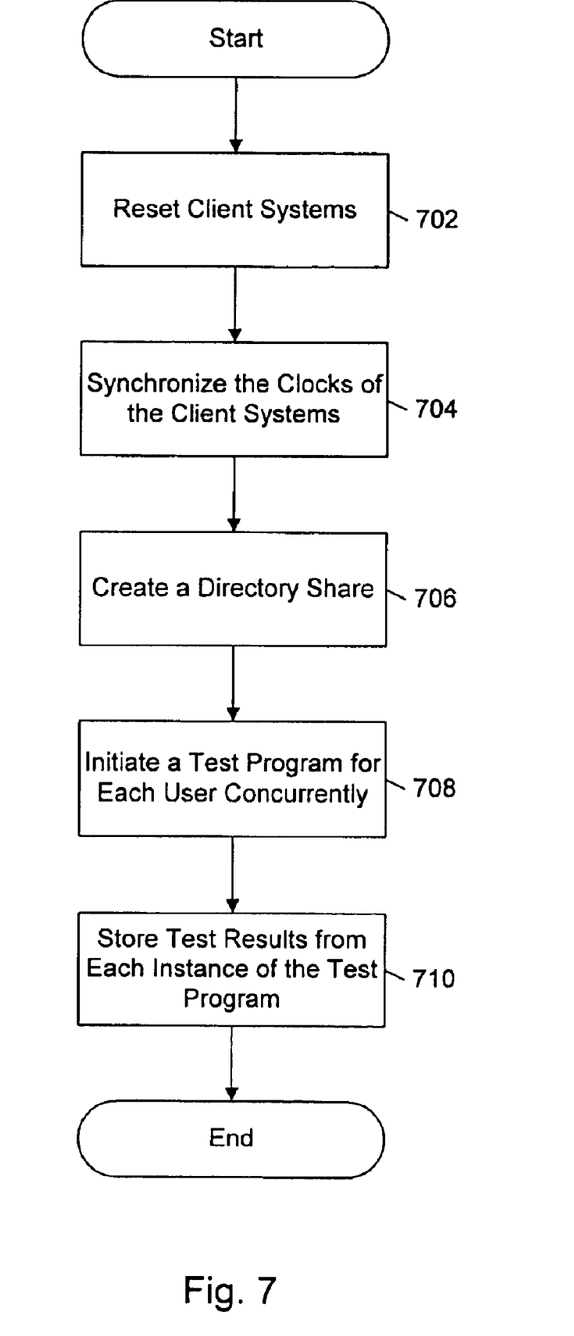
FIG. 7 is a flow chart illustrating a method for concurrently executing instances of a test program.

Turning now to FIG. 7, a flow chart illustrating a method for concurrently executing instances of a test program is shown. A test script may perform the method described in FIG. 7. Client systems may be reset as indicated in block 702. The clocks of the client systems may be synchronized as indicated in block 704. A directory share may be created as indicated in block 706. A directory share may be used to indicate a directory location of the home directories of the users. For example, a directory share "m:" may be created to refer to the directory \users shown in FIG. 6. A test program may be initiated for each user concurrently as indicated in block 708. Test results from each instance of the test program may be stored as indicated in block 710.

Figure 8A:
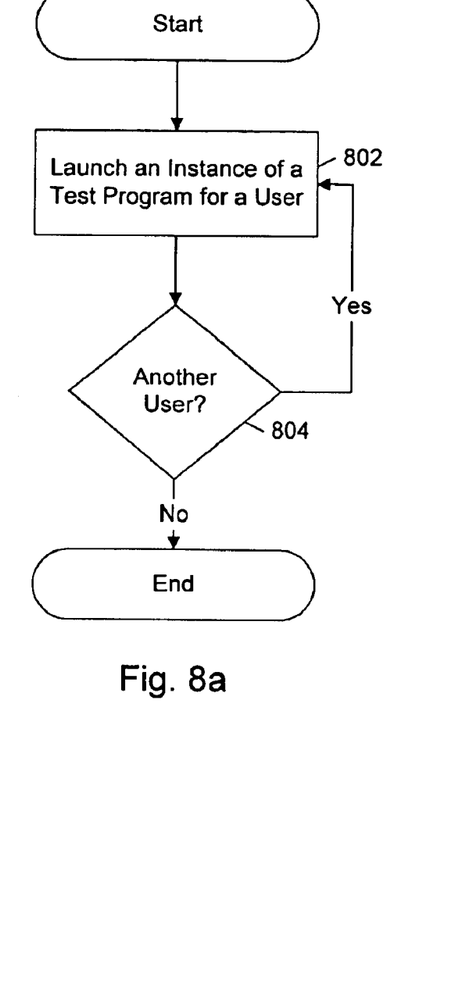
FIG. 8a is a flow chart illustrating a method for initiating instances of a test program.

A flow chart illustrating a method for initiating instances of a test program as indicated in block 708 is shown in FIG. 8a. An instance of a test program may be launched for a user as indicated in block 802. A determination may be made as to whether an instance of the test program is to be launched for another user as indicated in block 804. If an instance of the test program is to be launched for another user, then the function performed in block 802 may be repeated.

Figure 8B:
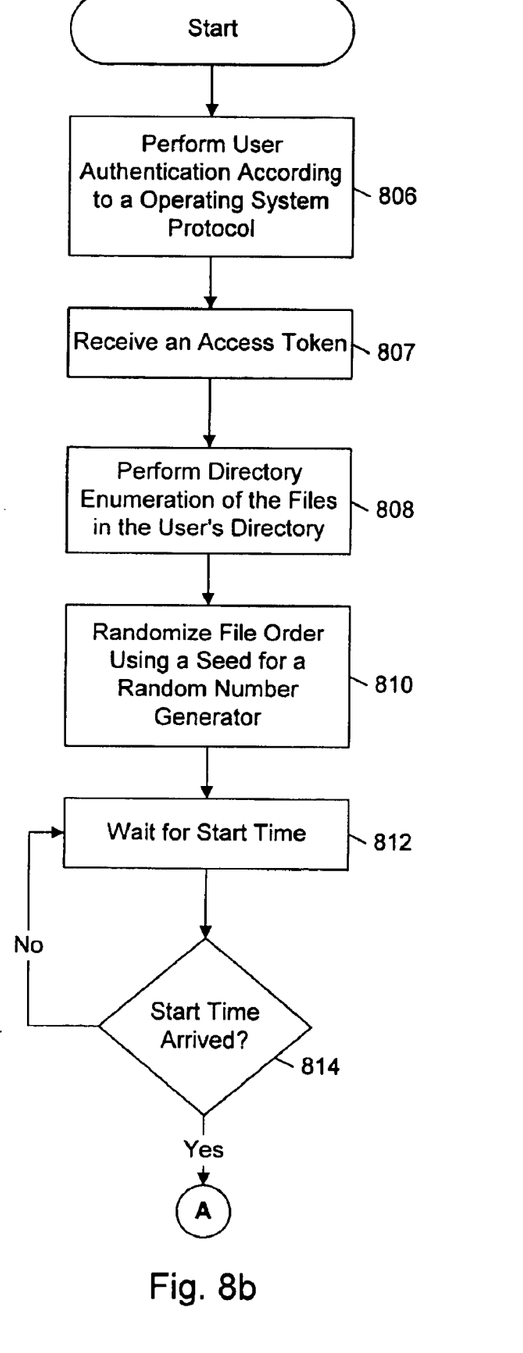
FIG. 8b is a first portion of a flow chart illustrating a method for testing server latencies.
Figure 8C:
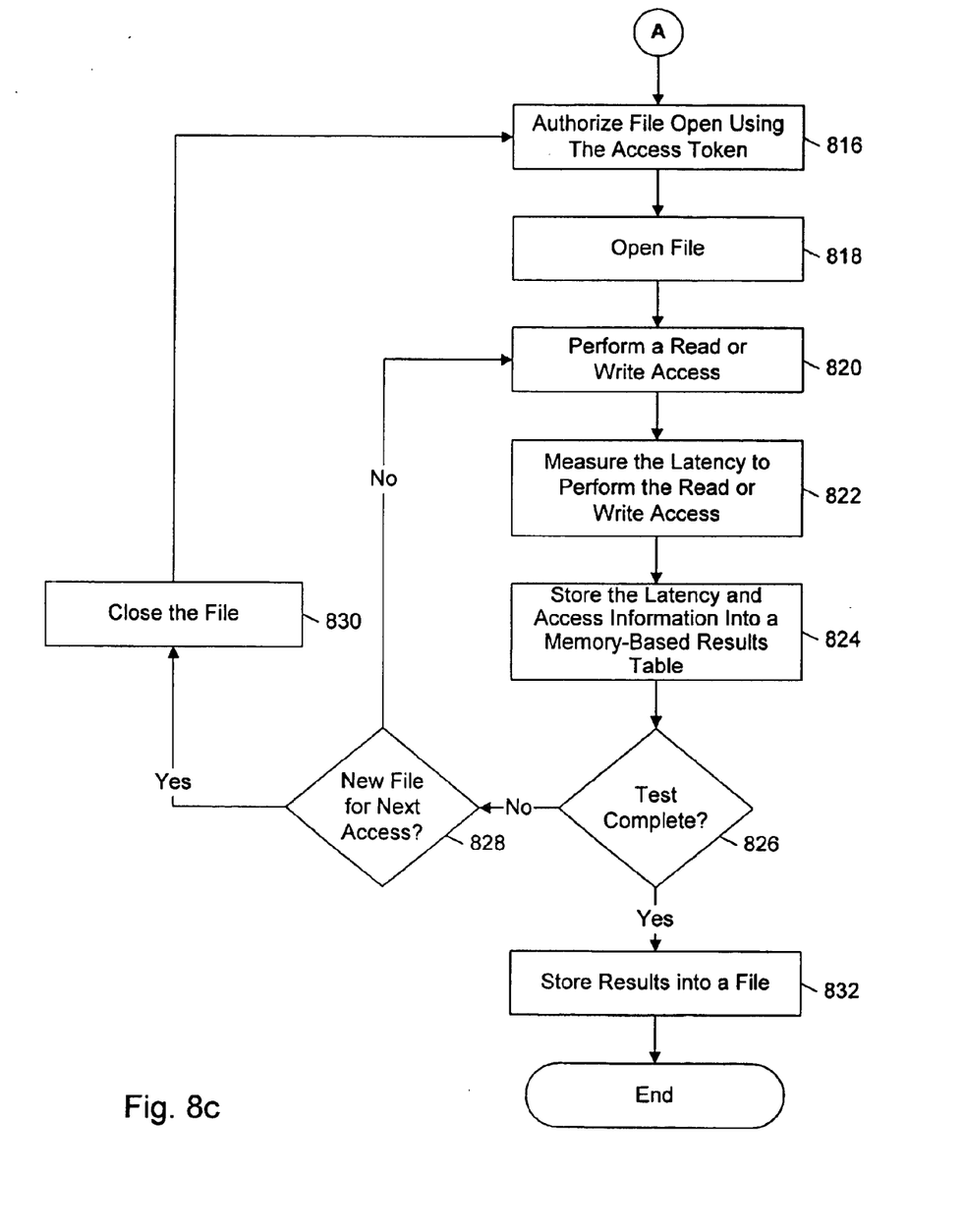
FIG. 8c is a second portion of a flow chart illustrating a method for testing server latencies.

Turning now to FIGS. 8b and 8c, a flow chart illustrating a method for testing server latencies is shown. Each instance of the test program referred to in FIG. 7 may be configured to perform the method described in FIGS. 8b and 8c. A user authentication may be performed according to an operating system protocol as indicated in block 806. A user may be logged in to a server using an operating system protocol of a client. The operating system protocols may include a UNIX desktop login method, Windows NT 4.0 Workstation login method, or Windows 2000 Professional login method. The server may validate the logon of the user. An access token may be received as indicated in block 807. The access token may be generated by the server and may be conveyed to the client that is executing the instance of the test program.

Figure 9A:
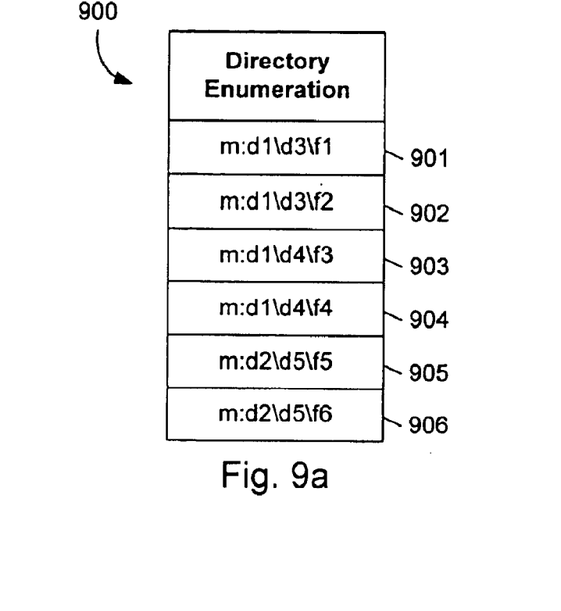
FIG. 9a is a table illustrating an example of a directory enumeration table.
Figure 9B:
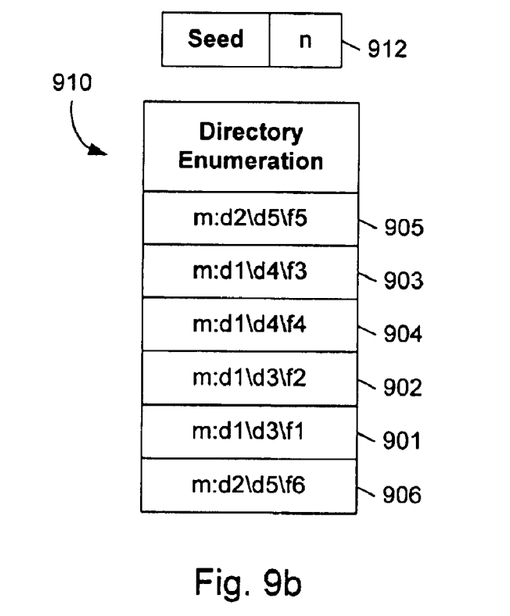
FIG. 9b is a table illustrating an example ordering of a directory enumeration table using a first seed value.
Figure 9C:
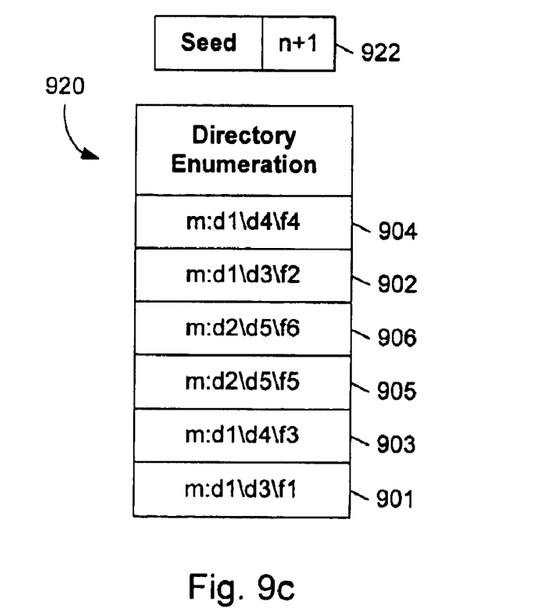
FIG. 9c is a table illustrating an example ordering of a directory enumeration table using a second seed value.

Directory enumeration of the files in the user's directory may be performed as indicated in block 808. FIGS. 9a, 9b, and 9c illustrate an example of a directory enumeration table and examples of ordering a directory enumeration table using seed values. FIGS. 9a, 9b, and 9c refer back to the directory structure shown in FIG. 4b. Directory enumeration table 900 lists the files in the user's directory structure using the directory share created in block 706 of FIG. 7. As may be seen, file 901 may be listed in directory enumeration table 900 as m:\d1\d3\f1. Files 902 through 906 may be listed similarly.

A file order may be randomized using a seed for a random number generator as indicated in block 810. In FIG. 9b, an ordering 910 of directory enumeration table 900 may be created using seed value n shown in seed 912. The seed value n of may be used by a random number generator to create ordering 910 such that the random number generator may create the same ordering 910 of files 901 through 906 each time the seed value n is used. The order created by using seed value n in FIG. 9b is file 905, file 903, file 904, file 902, file 901, and file 906. FIG. 9c illustrates ordering 920 where seed value n+1, shown in seed 922, may be used.

As may be seen, the order created by using seed value n+1 in FIG. 9c, file 904, file 902, file 906, file 905, file 903, and file 901, differs from that created by using seed value n in FIG. 9b.

The test program may be configured to access files (described below with respect to blocks 818 and 820) in the order created by the functions of blocks 808 and 810. In this manner, the results of a test program may be replicated by using the same seed value.

Blocks 812 and 814 indicate waiting for a start time to arrive before proceeding to block 816. The use of a start time may allow the access performed by each instance of the test program to begin concurrently. The chart of FIG. 8b may continue in FIG. 8c as indicated by the circled A.

Figure 10:
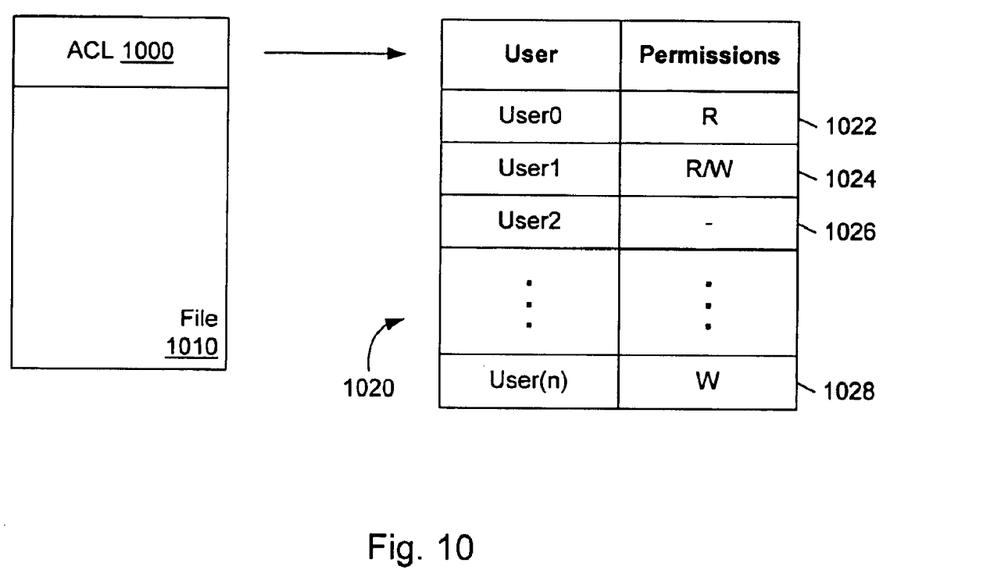
FIG. 10 is a block diagram illustrating one embodiment of permission checking structures that may be used by an operation system.

A file open may be authorized using the access token as indicated in block 816. FIG. 10 illustrates one embodiment of permission checking structures that may be used by an operation system to authorize the opening of a file. FIG. 10 depicts file 1010 with its corresponding file access control list (ACL) 1000. File ACL 1000 may point to data structure 1020 that lists the permissions of each user to file 1010. As may be seen, user0 has read permission as shown in entry 1022, user1 has read and write permission as shown in entry 1024, user2 has no permissions as shown in entry 1026, and user(n) has write permission as shown in entry 1028. When a user's access token is presented to the server where the user seeks to access file 1010, the server may reference file ACL 1000 to determine whether that user has permission to access file 1010.

Once the file open has been authorized, a file may be opened as indicated in block 818. A read or write access may be performed as indicated in block 820. The latency to perform the read or write access may be measured as indicated in block 822. The latency measurement may include the time to perform the file access as well as the time to authorize the opening of the file. The latency and access information may be stored as indicated in block 824.

A determination may be made as to whether the test is complete as indicated in block 826. If the test is not complete, a determination may be made as to whether a new file will be used for a next access as indicated in block 828. If a new file will be used for a next access, then the current file may be closed as indicated in block 830 and the operation may continue at block 816 as indicated. If a new file will not be used for a next access, then the operation may continue at block 820 as indicated. If the test is determined to be complete at block 826, then results may be stored into a file as indicated in block 832. The results may be stored onto the server.

In one particular embodiment of a test program, the test program may attempt to transfer a specified amount of data within a specified amount of time. If the amount of data to be transferred is too great to be transferred during the time limit, then the test program may continue until all of the data is transferred. The amount of data to be read or written may be expressed as a ratio, where 1 is read only and 0 is write only. Thus, a ratio of 0.5 along with an amount of data to be transferred of 1 megabyte would indicate that the test program if to read 0.5 megabytes and write 0.5 megabytes.

Each instance of test program may not operate continuously. Rather, each instance may be configured to start up at regular, specifiable intervals to perform a part of the total workload. This allows breaks between user activity. For example, the break between activities could be 1, 10, or 60 seconds.

| Parameter | Explanation |
| --- | --- |
| ReadRecordSize | The size in bytes that records may be read from files. |
| WriteRecordSize | The size in bytes that records may be written to files. |
| OnlyWriteAfter | This parameter may be for write accesses only and may be specified in bytes. The parameter may define the maximum amount of data to be written to a file when a write operation is performed. This parameter may cause write accesses to be stored up until this number is exceeded and may allow for fast/auto save functions to be mimicked. |
| WriteFileMinSize | The minimum file size that may be created during write operations and may be specified in bytes. |
| IOLimit | The total amount of data to be transferred during the duration of the test. |
| ReadRatio | The proportion of the IOLimit that will be read accesses. The value may be between 1 and 0 where a value of 1 indicates 100% read accesses and a value of 0 indicates 100% write accesses. 0.8, for example, would indicate 80% read data transferred and 20% write data transferred. |
| IODuration | The time period over which a test may be performed and may be specified in minutes. |
| IOTimeGranularity | The regular time intervals where the test program may start up to perform an access. This parameter may be specified in milliseconds. If this parameter value is set too low, the test program may begin a second access prior to a first access completing. |
| Seed | The value used by the random number generator in creating an order of files to be accessed. |
| StartDir | The directory structure that the test program operates on. For example, m:\user0. |
| ResultsDir | The directory and filename where the results may be saved. |

Each instance of the test program may save its results in a separate file on the client in which it operates. The results may include the following fields for each access performed.

| Field | Description |
| --- | --- |
| Field 1 | Descriptor for operation (e.g. read or write) |
| Field 2 | Time taken to transfer the data in milliseconds |
| Field 3 | Number of bytes read or written |
| Field 4 | Record size |
| Field 5 | Data and time stamp of operation |

The results may further include a summary line with the following fields.

| Field | Description |
| --- | --- |
| Field 1 | Summary descriptor |
| Field 2 | Total read time for test in seconds |
| Field 3 | Total bytes read during the test |
| Field 4 | Bytes read per second |
| Field 5 | Total number of files read |
| Field 6 | Total write time for test in seconds |
| Field 7 | Total bytes written during the test |
| Field 8 | Bytes written per second |
| Field 9 | Total number of files written |

The results may be analyzed to determine how a server performed under a user load generated by the test program.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A system comprising:
a server;
a first client coupled to said server;
wherein said server is configured to login a first user and a second user, wherein said first user corresponds to a first user type, and wherein said second user corresponds to a second user type, wherein said first client is configured to execute a first instance of a test program by said first user and a second instance of said test program by said second user substantially concurrently, wherein said first instance of said test program is configured to cause a first access to a first file on said server, wherein said second instance of said test program is configured to cause a second access to a second file on said server, wherein said first client is configured to store a first latency value associated with said first access, and wherein said first client is configured to store a second latency value associated with said second access; and
wherein said server is further configured to create a first directory for said first user, wherein said server is configured to populate said first directory with a first plurality of files according to said first user type, wherein said first plurality of files includes said first file, wherein server is configured to create a second directory for said second user, wherein said server is configured to populate said second directory with a second plurality of files according to said second user type, and wherein said second plurality of files includes said second file.

2. The system of claim 1, wherein said server is configured to verify that said first user has permission to access said first file in response to said first access.

3. The system of claim 2, wherein said first latency value represents a first time portion corresponding to said first access and a second time portion corresponding to said server verifying said first user has permission to access said first file.

4. The system of claim 1, wherein said first instance of said test program is configured to identify each of said first plurality of files in said first directory, wherein said first instance of said test program is configured to create a first order of said first plurality of files using a first seed value, wherein said second instance of said test program is configured to identify each of said second plurality of files in said second directory, and wherein said second instance of said test program is configured to create a second order of said second plurality of files using a second seed value.

5. The system of claim 1, further comprising:
a second client coupled to said server;
wherein said server is configured to login a third user, wherein said second client is configured to execute a third instance of said test program by said third user substantially concurrently with initiating said first instance and said second instance, wherein said third instance of said test program is configured to cause a third access to a third file on said server, and wherein said second client is configured to store a third latency value associated with said third access.

6. The system of claim 5, wherein said server is configured to verify that said third user has permission to access said third file.

7. The system of claim 6, wherein said third latency value represents a first time portion corresponding to said third access and a second time portion corresponding to said server verifying said third user has permission to access said third file.

8. The system of claim 1, wherein said server is configured to login said first user using a first operating system protocol, and wherein said server is configured to login said second user using a second operating system protocol.

9. The system of claim 1, wherein said server is configured to convey a first token to said first client in response to logging in said first user, and wherein said server is configured to convey a second token to said first client in response to logging in said second user.

10. The system of claim 9, wherein said server is configured to verify that said first user has permission to access said first file in response to said first access using said first token, and wherein said server is configured to verify that said second user has permission to access said second file in response to said second access using said second token.

11. The system of claim 1, wherein said first instance of said test program is configured to cause a third access to a third file on said server, wherein said second instance of said test program is configured to cause a fourth access to a fourth file on said server, wherein said first client is configured to store a third latency value associated with said third access, and wherein said second client is configured to store a fourth latency value associated with said fourth access.

12. The system of claim 1, wherein said first access comprises a first read access or a first write access, and wherein said second access comprises a second read access or a second write access.

13. A method comprising:
   logging in a first user to a server;
   logging in a second user to said server, wherein said first user corresponds to a first user type, and wherein said second user corresponds to a second user type;
   creating a first directory for said first user;
   populating said first directory with a first plurality of files according to said first user type, wherein said first plurality of files includes a first file;
   creating a second directory for said second user;
   populating said second directory with a second plurality of files according to said second user type, wherein said second plurality of files includes a second file;
   executing a first instance of a test program by said first user including:
      performing a first access to said a first file on said server; and
      storing a first latency value associated with said first access; and
   executing a second instance of said test program by said second user substantially concurrently with said executing said first instance of said test program including:
      performing a second access to said a second file on said server; and
      storing a second latency value associated with said second access.

14. The method of claim 13, further comprising:
   verifing that said first user has permission to access said first file in response to said first access.

15. The method of claim 14, wherein said first latency value represents a first time portion corresponding to said first access and a second time portion corresponding to said verifying.

16. The method of claim 13, further comprising:
   wherein said executing said first instance further comprises:
      identifing each of said first plurality of files in said first directory; and
      creating a first order of said first plurality of files using a first seed value; and
   wherein said executing said second instance further comprises:
      identifing each of said second plurality of files in said second directory; and
      creating a second order of said second plurality of files using a second seed value.

17. The method of claim 13, further comprising:
   wherein said logging in said first user further comprises:
      logging in said first user using a first operating system protocol; and
   wherein said logging in said second user further comprises:
      logging in said second user using a second operating system protocol.

18. The method of claim 13, further comprising:
   generating a first token in response to said logging in said first user; and
   generating a second token in response to said logging in said second user.

19. The method of claim 18, further comprising:
   verifying that said first user has permission to access said first file in response to said first access using said first token; and
   verifying that said second user has permission to access said second file in response to said second access using said second token.

20. The method of claim 13, wherein said first access comprises a first read access or a first write access, and wherein said second access comprises a second read access or a second write access.

* * * * *